(12) United States Patent
Nishibori et al.

(10) Patent No.: US 7,377,762 B2
(45) Date of Patent: May 27, 2008

(54) SYSTEM FOR PRODUCING RESIN MOLDED ARTICLE WITH SPRING STRUCTURE

(75) Inventors: Sadao Nishibori, Gifu (JP); Iwao Kouno, Gifu (JP); Yuichiro Nakamura, Gifu (JP)

(73) Assignee: Ein Co., Ltd. Technical Center, Gifu (JP)

( * ) Notice: Subject to any disclaimer, the term of this patent is extended or adjusted under 35 U.S.C. 154(b) by 184 days.

(21) Appl. No.: 10/541,550

(22) PCT Filed: Dec. 24, 2003

(86) PCT No.: PCT/JP03/16606

§ 371 (c)(1),
(2), (4) Date: Jul. 6, 2005

(87) PCT Pub. No.: WO2004/063450

PCT Pub. Date: Jul. 29, 2004

(65) Prior Publication Data

US 2006/0116045 A1 Jun. 1, 2006

(30) Foreign Application Priority Data

Jan. 10, 2003 (JP) .............................. 2003-005121

(51) Int. Cl.
*D01D 5/088* (2006.01)
(52) U.S. Cl. ............... 425/71; 264/178 F; 425/308; 425/377; 425/382.2; 425/464
(58) Field of Classification Search ............ 425/71, 425/308, 315, 377, 382.2, 464; 264/178 F
See application file for complete search history.

(56) References Cited

U.S. PATENT DOCUMENTS 3,691,004 A * 9/1972 Werner et al. .............. 428/219

(Continued)

FOREIGN PATENT DOCUMENTS

EP 1182286 2/2002

(Continued)

OTHER PUBLICATIONS

Patent Abstract of Japan, Publication No. 01-207462, Published Aug. 21, 1989.

(Continued)

*Primary Examiner*—Robert B. Davis
*Assistant Examiner*—Joseph Leyson
(74) *Attorney, Agent, or Firm*—Shlesinger, Arkwright & Garvey LLP

(57) ABSTRACT

The present invention relates to a resin-molded article with a spring structure, and to a method and apparatus for preparing a superficial layer of such a resin-molded article with a spring structure which has surfaces free from undulations, comprises fused filaments whose fusion is resistant to separation, maintains its cushioning activity and strength even after long use. A water flows from a cooling water outlet 53*b* into a space between a water-permeating sheet 55 and an inclined plate 51*a*. Some part of the flowing water C penetrates the water-permeating sheet 55 to appear on its top surface to form there an overlying current M on which receives lengthwise arranged peripheral continuous filaments, and agitates them to cause adjacent filaments to contact each other, to be entwined and gathered, thereby enabling the formation of a superficial layer of the three-dimensional structure 3.

3 Claims, 16 Drawing Sheets

U.S. PATENT DOCUMENTS

| | | | | |
|---|---|---|---|---|
| 3,936,337 | A | * | 2/1976 | Stapp .................... 156/167 |
| 4,012,249 | A | * | 3/1977 | Stapp .................... 156/167 |
| 4,859,516 | A | * | 8/1989 | Yamanaka et al. ............ 428/92 |
| 4,913,757 | A | * | 4/1990 | Yamanaka et al. .......... 156/167 |
| 4,952,265 | A | | 8/1990 | Yamanaka et al. |
| 5,639,543 | A | | 6/1997 | Isoda et al. |
| 6,378,150 | B1 | * | 4/2002 | Minegishi et al. ........... 5/652.1 |

FOREIGN PATENT DOCUMENTS

| | | |
|---|---|---|
| EP | 1270787 | 1/2003 |
| WO | WO 01/68967 | 9/2001 |

OTHER PUBLICATIONS

Patent Abstract of Japan, Publication No. 01-241264, Published Sep. 26, 1989.

Patent Abstract of Japan, Publication No. 05-106153, Published Apr. 27, 1993.

Patent Abstract of Japan, Publication No. 07-068061, Published Mar. 14, 1995.

Patent Abstract of Japan, Publication No. 07-068284, Published Mar. 14, 1995.

Patent Abstract of Japan, Publication No. 07-189106, Published Jul. 25, 1995.

Patent Abstract of Japan, Publication No. 08-074161, Published Mar. 19, 1996.

Patent Abstract of Japan, Publication No. 08-099093, Published Apr. 16, 1996.

Patent Abstract of Japan, Publication No. 09-021054, Published Jan. 21, 1997.

Patent Abstract of Japan, Publication No. 62-128739, Published Jun. 11, 1987.

* cited by examiner

FIG. 6(A)
FIG. 6(B)
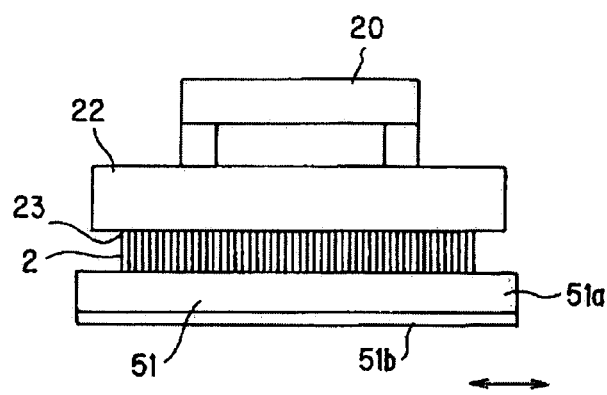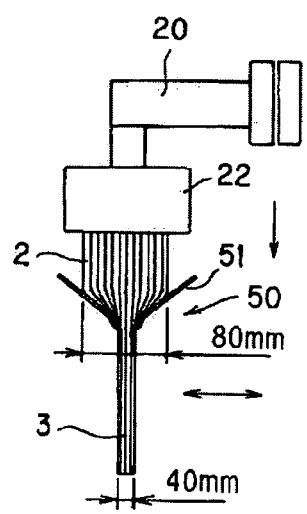

FIG. 10
Method 1
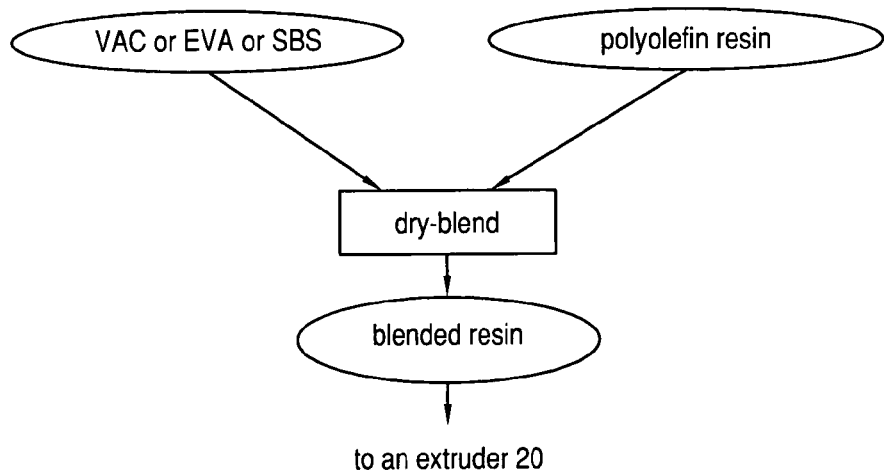
Method 2
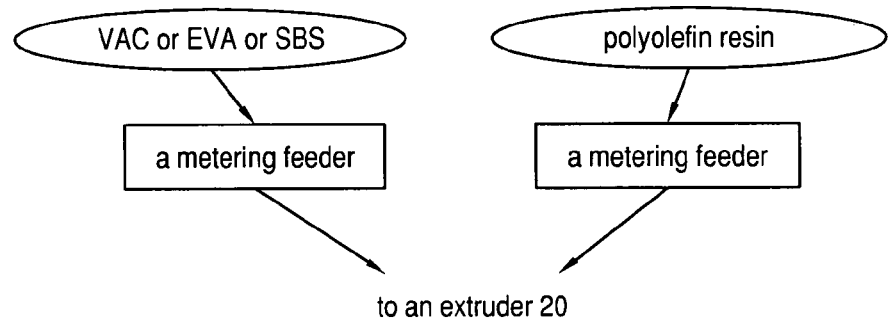
Method 3
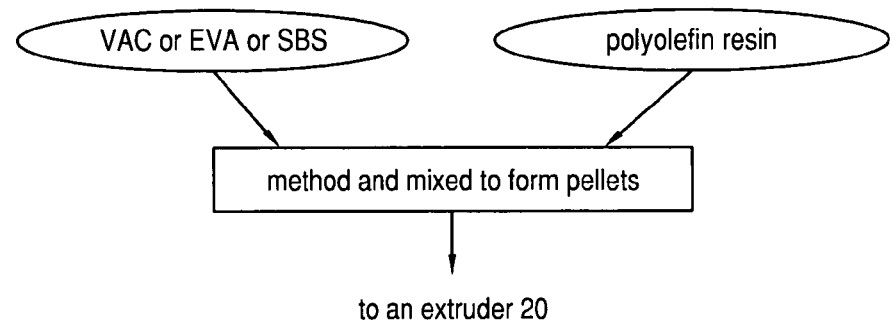

Undulated surface of Products

γ : Pilot system
δ : The present invention

A loop is uncompleted by slip.

Fusion of adjacent loops or curls is separated.

SYSTEM FOR PRODUCING RESIN MOLDED ARTICLE WITH SPRING STRUCTURE

BACKGROUND OF THE INVENTION

1. Field of the Invention

The present invention relates to a resin-molded article with a spring structure, and to a method and apparatus for preparing a superficial layer of such a resin-molded article with a spring structure. More specifically, the present invention aims to provide a resin-molded article with a spring structure which comprises the loops and curls of a three-dimensional structure such as filaments of a resin extending in a three-dimensional space, and a method for improving the quality of a superficial layer of the resin-molded article, thereby making the resin-molded article with a spring structure more adaptable to widely different applications, and adding to the value of the resin-molded article with a spring structure.

2. Description of the Prior Art

Various proposals as to the method of producing resin-molded articles with a spring structure and apparatuses suitable for the manufacture thereof have been presented.

Such proposals can be seen, for example, in Japanese Unexamined Patent Application Publications Nos. 1-207462, 1-241264, 5-106153, 7-68061, 7-68284, 7-189106, 8-74161, 8-99093, and 9-21054, Japanese Examined Patent Application Publications Nos. 3-17668 and 4-33906, and WO 01/68967A1.

Among such proposals, one advocates the use of an extrusion molding system which is equipped with shoots for guiding filaments falling from a die.

An exemplary molding system comprises two rod-like heaters arranged on the two long sides of a bundle of falling filaments (the bundle is responsible for the formation of a three-dimensional structure as described herein), and a pair of panels arranged beneath the respective heaters. Each panel consists of two strips: the upper strip forms a slope of about 45-80° with respect to a horizontal plane and the lower one is submerged under cooling water. The two lower strips can be driven centrally to enclose the bundle of filaments in a gap between them.

Another exemplary molding system comprises static or movable curved plates coated with a fluorine resin arranged along a bundle of filaments to modify the bundle into a three-dimensional structure whose density and shape can be adjusted as desired.

See Japanese Examined Patent Application Publication No. 4-33906 and or WO 01/68967A1.

The applicants of the present invention had developed a system (to be referred to simply as the pilot system hereinafter) for forming a three-dimensional structure as shown in FIGS. 12-15 during their pursuit of the present invention. The pilot system allows cooling water M to flow down over shoots 51 with which a bundle of melted continuous filaments are firstly brought into contact so as to cool the bundle of filaments 2, to thereby prevent the adhesion of filaments to the shoots 51. Each shoot 51 consists of a stainless steel plate whose working surface is coated with a fluorine resin. Coating of a fluorine resin is for preventing the adhesion of filaments 2 to the shoot 51, and promoting the spread of cooling water M over the shoot 51. Above each shoot 51 consisting of a fluorine resin-coated plate, is placed a water tank 53 for storing cooling water which has, on its bottom, a row of holes having a specified diameter being separated from each other with a specified distance. The water tanks 53 shed, like a shower, a row of cooling water M over the shoots 51. Melted filaments 2, being brought into contact with cooling water M flowing down over the shoots 51, are distorted as a result of cooling and agitation, and the filaments now deformed in loops and curls fall into a water bath 26 below.

According to a system disclosed in the Japanese Examined Patent Application Publication No. 4-33906, a bundle of filaments, when it reaches a level just above the surface of cooling water, is sandwiched by a pair of inclined upper strips which restrict the thckness of the bundle. Therefore, it may happen that parts of outward filaments fall directly on the upper strips, slip thereon and plunge into the cooling water.

A conventional system as disclosed in WO 01/68967A1 often produces resin-molded articles with a spring structure whose surfaces become rough or nappy because of defective loop or curls formation.

The pilot system also exhibits following problems, and is restricted in its improvement of the quality of products.

The cooling water does not evenly spread over the shoots 51 because of the water-repellent activity of the fluorine resin coats. The water-repellent coat hinders the uniform spread of cooling water (see FIGS. 12 and 15). Some thin water currents M independently flow down straight over the shoots 51 after they contact with the latter, while other thin water currents merge with each other. This makes it difficult to uniformly cool the entire lengthwise surfaces of a resin-molded article with a spring structure. Moreover, filaments 2 slip so readily on the fluorine resin-coated surfaces that the loop or curl formation of the filaments is disturbed (see FIG. 16(B)).

The joining distances ($\gamma$ in FIG. 16(A)) required for gathering and compressing continuous melted filaments are rather short. Even if the joining distance is made large, the produced resin-molded article will have an insufficient cushion property because of the fact that the three dimensional structure is not uniformly cooled with this system.

As a consequence, the resin-molded articles with a spring structure produced by the pilot system exhibit following shortcomings.

Filaments are often cooled so much that the spring structural resin molded product produced by the system have undulated surfaces (see FIG. 15(A)). For example, on some parts of the shoots 51, water currents merge (see streak E of FIG. 14), and filaments exposed to such merged currents are cooled so much that the resin constituting the filaments shrinks and becomes less adhesive.

On the other hand, with regard to filaments exposed to independent thin currents, they are not cooled so much that their loops and curls are distorted. Thus, the filaments constituting the superficial layers 4, 5 of a resin-molded article 3 with a spring structure produced by the pilot system often have defective loops and curls. When thin water currents merge into one, there is formed a water deficient line(s) (see streak S of FIG. 14) on one or both sides of the thickened current. Melted continuous filaments exposed to such water deficient lines are not sufficiently cooled, and mechanically so fragile that, when they are pulled downward during falling, they are easily cleaved. Their cut ends spread and exhibit a characteristic pattern. When the cut ends are spiky, they take pattern (1) (see FIG. 15(B)). When the cut ends are thread-like or cord-like and stretched during falling, they take pattern (2) (see FIG. 15(C)).

Thus, the water films formed over the shoots do not have a uniform thickness, and with regard to a resin-molded article with a spring structure exposed to such water films, fusion of adjacent loops and curls is readily released (see FIG. 16(C)). This is because loops and curls have different adhesive activities owing to the uneven distribution of cooling water on the shoots. When a three-dimensional structure affected with such defects is bent, fused portions of loops and curls are easily separated giving a crush sound (see FIG. 16(C)). Such a three-dimensional structure may be defective in cushioning activity and strength.

The defective formation of loops and curls is accompanied by the distorted formation of individual filaments, resulted in changing in sectional view of the filament. If the filament is a hollow filament, for example, it will have a distorted cross-section instead of a normal round shape.

Because with the pilot system it is not possible to exert strong compression, the resin-molded article produced by the system cannot help but having a large thickness. If strong compression is simply applied using the pilot system without introducing any appropriate compensatory modifications, the resulting resin-molded article will have a reduced cushion property as well as a reduced thickness.

When the pilot system exhibiting the shortcomings as described above is used for the production of resin-molded articles with a spring structure, the resin-molded articles or products using the resin-molded article as a material exhibit following problems.

If it is required to insert a resin-molded article with a spring structure in a covering member, the undulated, nappy, or spiky surfaces of the article will get caught by the covering member, and damage the latter, or conversely fused loops forming the surfaces of the article will be pulled apart to be damaged.

Fused joints of adjacent filaments of a three-dimensional structure are susceptible to cleavage, and the cushioning property of a resin-molded article deteriorates after long use.

The resin-molded article must have a comparatively large thickness which leads to the enlargement of the volume. This causes clumsiness for handling which may lead to the increase of a production cost.

In view of above, the present invention aims to provide a system for producing a resin-molded article with a spring structure capable of uniformly distributing cooling water over the entire surfaces of shoots, thereby relieving a three-dimensional structure of the risk of being exposed either to thickened water currents or to thinned water currents, applying strong compression on the three-dimensional structure, and preventing the separation of fused loops constituting the three-dimensional structure. The present invention also aims to provide a resin-molded article with a spring structure where the surfaces are practically free from undulations, fusion of adjacent loops is prevented against separation, the cushioning property and strength are maintained even after long use, and its weight is comparatively light which is advantageous from an economical viewpoint for the material.

SUMMARY OF THE INVENTION

The resin-molded article with a spring structure of the present invention is a three-dimensional structure including voids at a predetermined bulk density obtained by contacting, entwining, and gathering adjacent ones of random loops or curls of continuous, solid and/or hollow filaments made from a thermoplastic resin and/or a thermoplastic elastomer. With regard to the resin-molded article with a spring structure, the bulk density of its oppositely disposed superficial layers may be 0.2 to 0.5 g/cm$^3$, preferably 0.3 to 0.4 g/cm$^3$. Their void ratio may be 44 to 77%, more preferably 56 to 67%. A core layer sandwiched between the superficial layers may have a bulk density of 0.01 to 0.15 g/cm$^3$, preferably 0.03 to 0.05 g/cm$^3$. Its void ratio may be 83 to 99%, more preferably 94 to 97%.

The method of this invention for preparing the superficial layers of a resin-molded article with a spring structure comprises the steps of forming, during the production of a three-dimensional structure including voids at a predetermined bulk density which is obtained by contacting, entwining, and gathering adjacent ones of random loops or curls of continuous, solid and/or hollow filaments made from a thermoplastic resin or a thermoplastic elastomer, exposing the lengthwise aspects of a three-dimensional structure comprising melted filaments extruded from a die to uniform cooling water films, and causing peripheral filaments located along the lengthwise sides to contact and fuse with each other to form loops and curls, and producing a three-dimensional structure whose oppositely disposed superficial layers largely comprise loops and curls and have a higher density while the core layer sandwiched between the two superficial layers has a lower density.

The system of the invention for preparing the superficial layer of a resin-molded article with a spring structure is a system for extruding a melt of a thermoplastic resin and/or thermoplastic elastomer to convert it into solid and/or hollow continuous filaments, causing adjacent filaments to contact each other, entwine, and gather to form loops and curls, and thus forming a three-dimensional structure having a predetermined bulk density.

The system of the invention is characterized by comprising a pair of shoots whose opposite surfaces are inclined downward centrally such that, when a bundle of filaments are passed through a gap between the shoots, the filaments are gathered towards the center and compressed during passage through the gap, water-permeating sheets covering the top surfaces of the shoots, and cooling water supply portions which flow cooling water to produce currents in a space between the water-permeating sheets and the top surfaces of the shoots, wherein some part of the current penetrates the water-permeating sheet to form an overlying current which uniformly spreads over the entire top surface of the water-permeating sheet, peripherally located continuous filaments constituting the lengthwise lateral portions of a three-dimensional structure are exposed to the uniform flow ends of water currents, to be agitated by the resulting eddies so much that they are deformed into loops and curls, and adjacent loops and curls are fused with each other through contact.

The "water-permeating sheet" is preferably made of a material such as cloth (bleached cloth) which allows water to permeate, is soft, and has a higher frictional coefficient than does stainless steel or a fluorine resin. The water-permeating sheet moderates the impact exerted by water currents on filaments, and inhibits the smooth sliding of filaments via frictions imposed on the filaments, thereby facilitating the filaments to form loops and curls. The thickness of the water-permeating sheet may be 0.001 to 1.0 mm, preferably 0.2 to 0.5 mm, or more preferably 0.3 to 0.4 mm.

The "continuous filaments" may include filaments made from general purpose plastics (polyolefins, polystyrene resins, methacryl resins, poly vinyl chloride, etc.) or engineering plastics (polyamide, polycarbonate, saturated polyester, polyacetal, etc.). For example, they are preferably made from thermoplastic elastomers such as polyethylene (PE hereinafter), polypropylene (PP hereinafter), PVC, or nylon. If the filaments are hollow, the cavity within each filament may be continuous, or comprise a series of discrete cavities.

For example, the cavity in a filament may be separated into sections with a septum placed between adjacent sections.

The advantages of the present invention are enumerated below.

Cooling water penetrating the water-permeating sheet appears on the top surface of the sheet and forms an overlying current there and prevents the adhesion of filaments to the shoot.

Since the water-permeating sheet has a higher frictional coefficient than does a fluorine coated (Teflon™ or the like) surface or a stainless steel, it exhibits a higher resistance to the falling movement of melted continuous filaments which helps the filaments to be deformed into loops and curls.

Since a bundle of melted continuous filaments fall on the water-permeating sheet covered with a water film which has a high cushioning activity, the filaments are protected against deformation. Particularly, if the filaments are hollow, it is possible to obtain a resin-molded article with a spring structure in which constituent filaments have a cross-section practically free from distortions, which advantageously adds to the value of the resin-molded article.

The advantages provided by the method of this invention are as follows.

The method makes it possible to produce a resin-molded article with a spring structure whose surfaces are uniformly smooth.

Since the joining distances required for gathering and compressing melted continuous filaments are comparatively large, wider portions of lengthwise arranged peripheral filaments are gathered and the resulting three-dimensional structure is more strongly compressed. As a consequence, fusion of adjacent filaments is more stressed, and the structure has an enhanced strength and higher cushioning activity.

Use of the resin-molded article with a spring structure of the invention as a material can provide following advantageous products.

It is possible to provide products which have a dense texture, are practically devoid of free cut ends, and have smooth surfaces free from undulations.

It is possible to provide products in which fusion of adjacent filaments is firm.

It is possible to provide products which are excellent in pressure dispersion because the superficial layers are highly dense and the constitutive filaments thereof are firmly fused to each other.

The product can have a small thickness, excellent cushion property, and resistance to collapse. It ensures a reduced cost and is resistant to repeated bending.

Loops and curls in the superficial layers of a product are generally in parallel with a direction in which the extruded filaments were propelled, and they provide the product with an effective pressure dispersing activity. Loops and curls in the core layer are practically in parallel with the crosswise direction, and are responsible for the cushion property of the product.

BRIEF DESCRIPTION OF THE DRAWINGS

The object and advantages of the invention will become understood from the following detailed description of preferred embodiments thereof in connection with the accompanying drawings in which like numerals designate like elements, and in which;

FIG. 6(A) shows the lateral view of a part of a three-dimensional structure, and FIG. 6(B) frontal view of the three-dimensional structure;

FIG. 10 schematically shows parts of different exemplary schemes for producing a resin-molded article 1 with a spring structure;

DETAILED DESCRIPTION OF THE PREFERRED EMBODIMENTS

Figure 1:
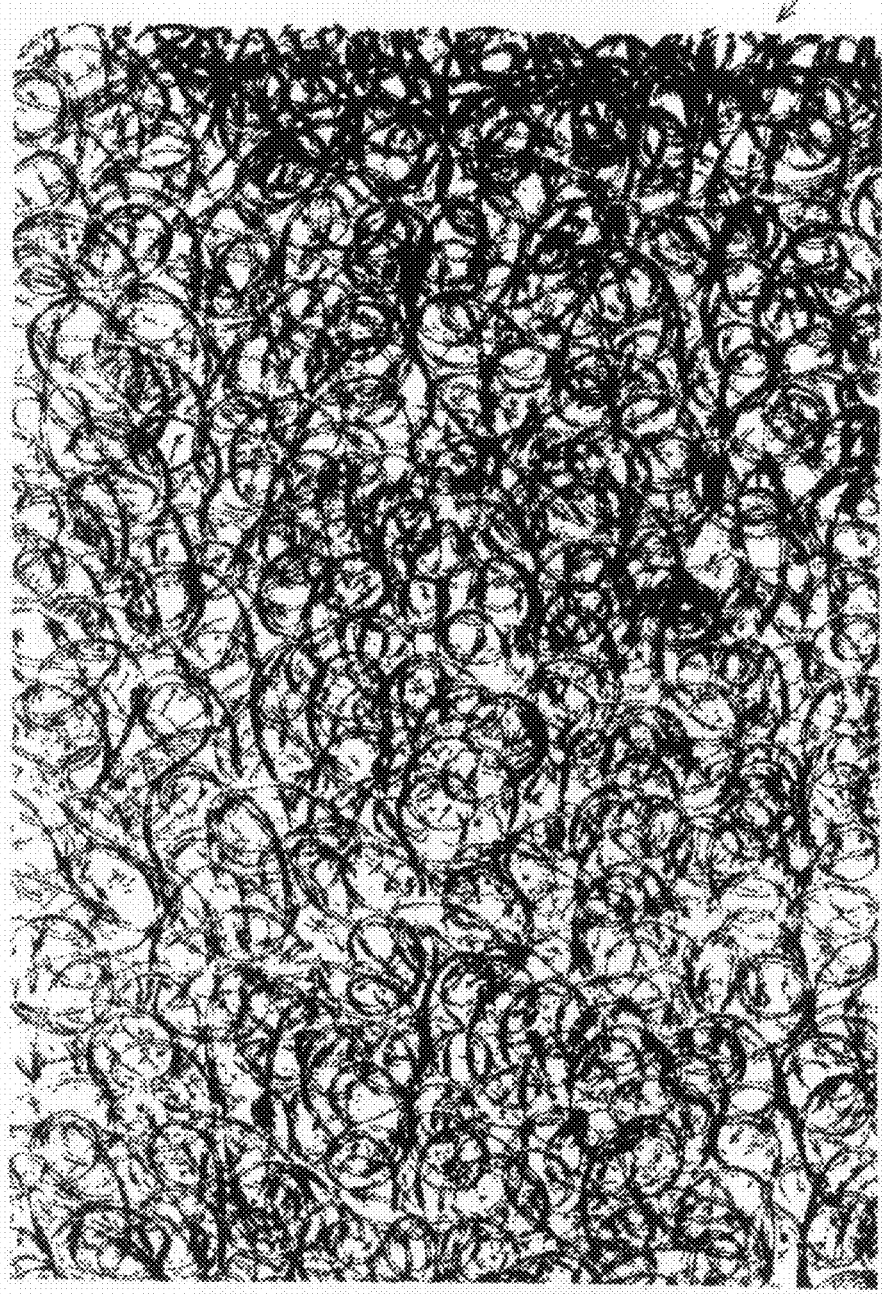
FIG. 1 shows a resin-molded article 1 with a spring structure.
Figure 2A:
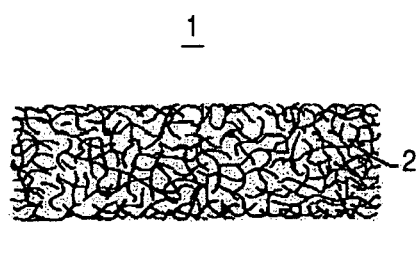
FIG. 2(A) shows the sectional view of a comparable resin-molded article with a spring structure, and FIGS. 2(B) and 2(C) the sectional views of a resin-molded article with a spring structure embodying the invention.
Figure 2B:
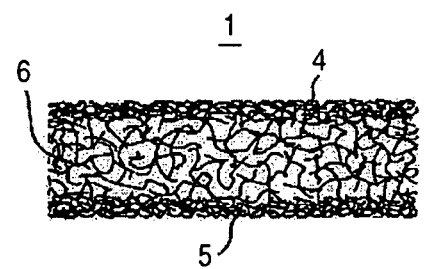
Figure 2C:
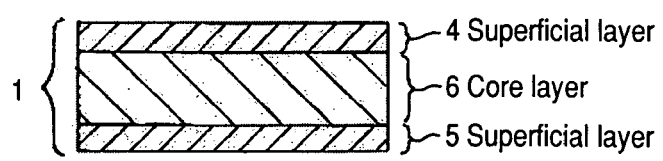

Description of a Spring Structural Resin Molded Product 1

A resin-molded article 1 with a spring structure embodying the present invention is a three-dimensional structure 3 with voids obtained by contacting, entwining, and gathering random continuous filaments 2 (hereinafter also simply called "filaments" 2) made from or primarily from a thermoplastic resin. The filaments 2 take the form of loops, and adjacent loops of the filaments contact, entwine and gather with each other. The process necessary for the production of a resin-molded article 1 with a spring structure is described later.

The dimensions of the resin-molded article 1 with a spring structure are as follows.

The bulk density of the resin-molded article 1 with a spring structure is 0.001 to 0.20 g/cm$^3$.

The preferred range of the bulk density of resin-molded article 1 with a spring structure is as follows. The bulk density of the resin-molded article 1 with a spring structure may be 0.08 to 0.20 g/cm$^3$, preferably 0.10 to 0.18 g/cm$^3$.

The void ratio of the resin-molded article 1 with a spring structure may be 78 to 91%, preferably 80 to 88%. The resin-molded article 1 with a spring structure comprises front and rear superficial layers 4 and 5 with a core layer 6 in between. The bulk density of each superficial layer may be 0.2 to 0.5 g/cm$^3$, preferably 0.3 to 0.4 g/cm$^3$. Its void ratio may be 44 to 77%, preferably 56 to 67%. The bulk density of the core layer may be 0.01 to 0.15 g/cm$^3$, preferably 0.03 to 0.05 g/cm$^3$. The void ratio of the core layer may be 83 to 99%, preferably 94 to 97%.

The diameter of the filaments constituting the resin-molded article 1 with a spring structure may be 0.3 to 3.0 mm, preferably 0.7 to 1.0 mm when the filaments are solid filaments. If the solid filaments had a diameter equal to or smaller than 0.3 mm, the filaments would lose resiliency and fusion of adjacent filaments occurs so frequently that the porosity of the resin-molded article would become undesirably low. On the contrary, if the solid filaments have a diameter equal to or larger than 3.0 mm, the filaments would become so resilient that they would not form loops, nor fuse with each other which would lead to the lowered strength. The diameter of the filaments constituting the resin-molded article 1 with a spring structure may be 1.0 to 3.0 mm, preferably 1.5 to 2.0 mm, most preferably 0.9 to 1.3 mm, when the filaments are hollow. The void ratio of each hollow fiber is preferably 10 to 80%. If the void ratio were equal to or lower than 10%, the hollow filaments would lose the merit of reducing the weight of the product relative to its bulk. On the contrary, if the void ratio were equal to or higher than 80%, the hollow filaments would have a reduced cushioning activity.

The resin-molded article 1 with a spring structure may have a thickness of 10 to 50 mm, preferably 20 to 40 mm. Its length and width may be determined as appropriate.

The resin-molded article 1 with a spring structure may have a void ratio in the range described below, to maintain its elasticity and strength as long as it exists as a three dimensional structure, as well as to reduce its weight.

Void ratio (%)=(1−bulk density/density of resin)×100

If a mixture of solid filaments and hollow filaments is used as a material of the filaments constituting a resin-molded article 1, the mixing ratio of solid filaments to hollow filaments is preferably 0 to 50:50 to 100.

Furthermore, if hollow filaments are placed at the core, and surrounded by solid ones which are placed in superficial layers, the resulting resin-molded article will be desirable because it will give an agreeable touch feel.

The thermoplastic resin serving as a material of the resin-molded article 1 with a spring structure includes particularly preferably polyolefin resins such as polyethylene (PE), polypropylene (PP), etc. A vinyl acetate resin (VAC hereinafter), ethylene vinyl acetate copolymer (EVA hereinafter), or styrene butadiene styrene (SBS hereinafter) is preferably used, or a mixture of them may be used. The polyolefin resin may include recycled resins.

The thermoplastic resin is preferably made from a mixture obtained by combining two or more chosen from polyolefin resins, vinyl acetate resins, ethylene vinyl acetate copolymers and styrene butadiene styrene. The resin-molded article 1 with a spring structure preferably comprises a three-dimensional structure made from a mixture (e.g., thermoplastic elastomer) obtained by mixing a polyolefin resin such as PE or PP with VAC, EVA or SBS.

The mixing ratio of a poly olefin resin to VAC or EVA in terms of the weight of vinyl acetate of the latter may be 70 to 97 wt %: 3 to 30 wt %, preferably 80 to 90 wt %: 10 to 20 wt %.

If the VAC or EVA content were equal to or lower than 3 wt %, the impact resilience of the three-dimensional structure would be reduced. On the contrary, if the VAC or EVA content were equal to or higher than 30 wt %, the thermal stability of the three-dimensional structure would be impaired.

The mixing ratio of a polyolefin resin to SBS may be 50 to 97 wt %: 3 to 50 wt %, preferably 70 to 90 wt %: 10 to 30 wt %.

System for Molding a Three-Dimensional Structure 10

Figure 3:
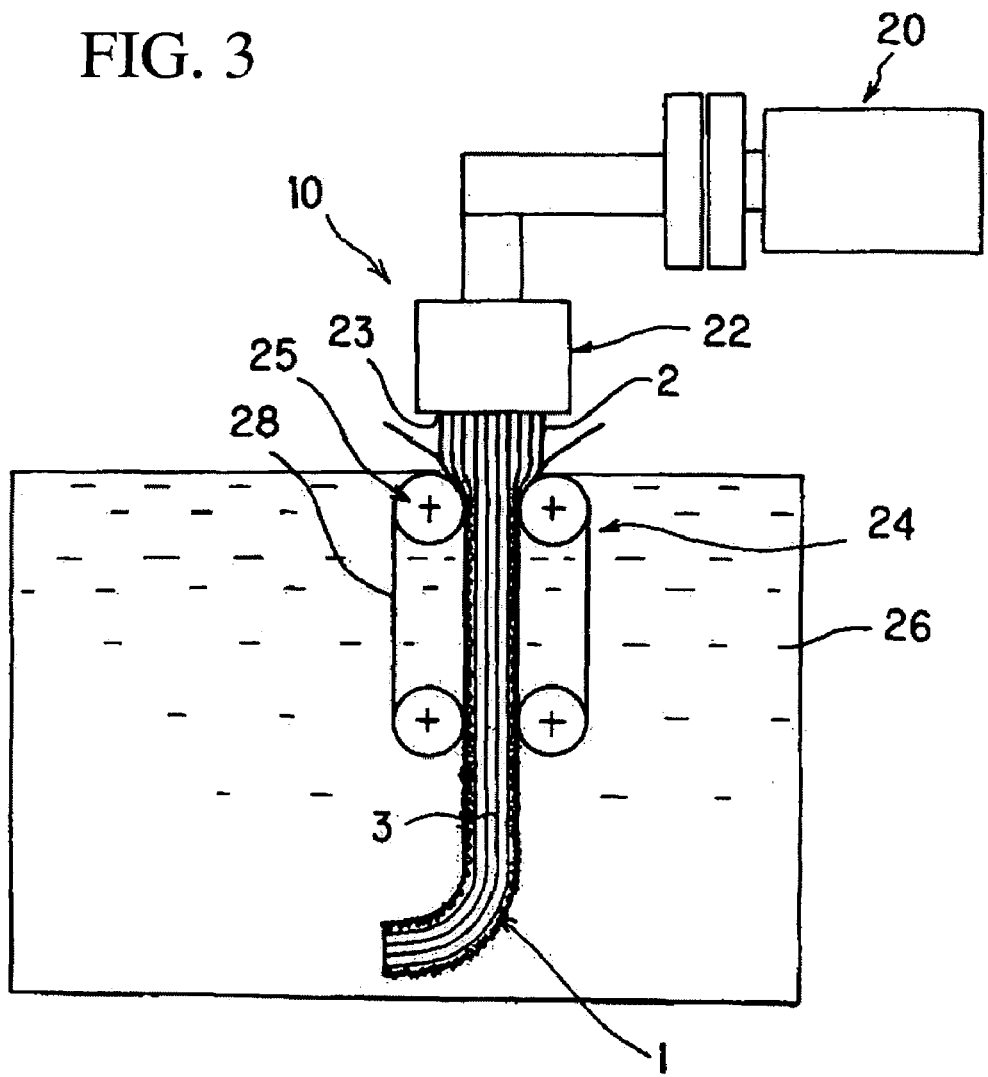
FIG. 3 shows an exemplary method for producing a resin-molded article 1 with a spring structure.
Figure 4:
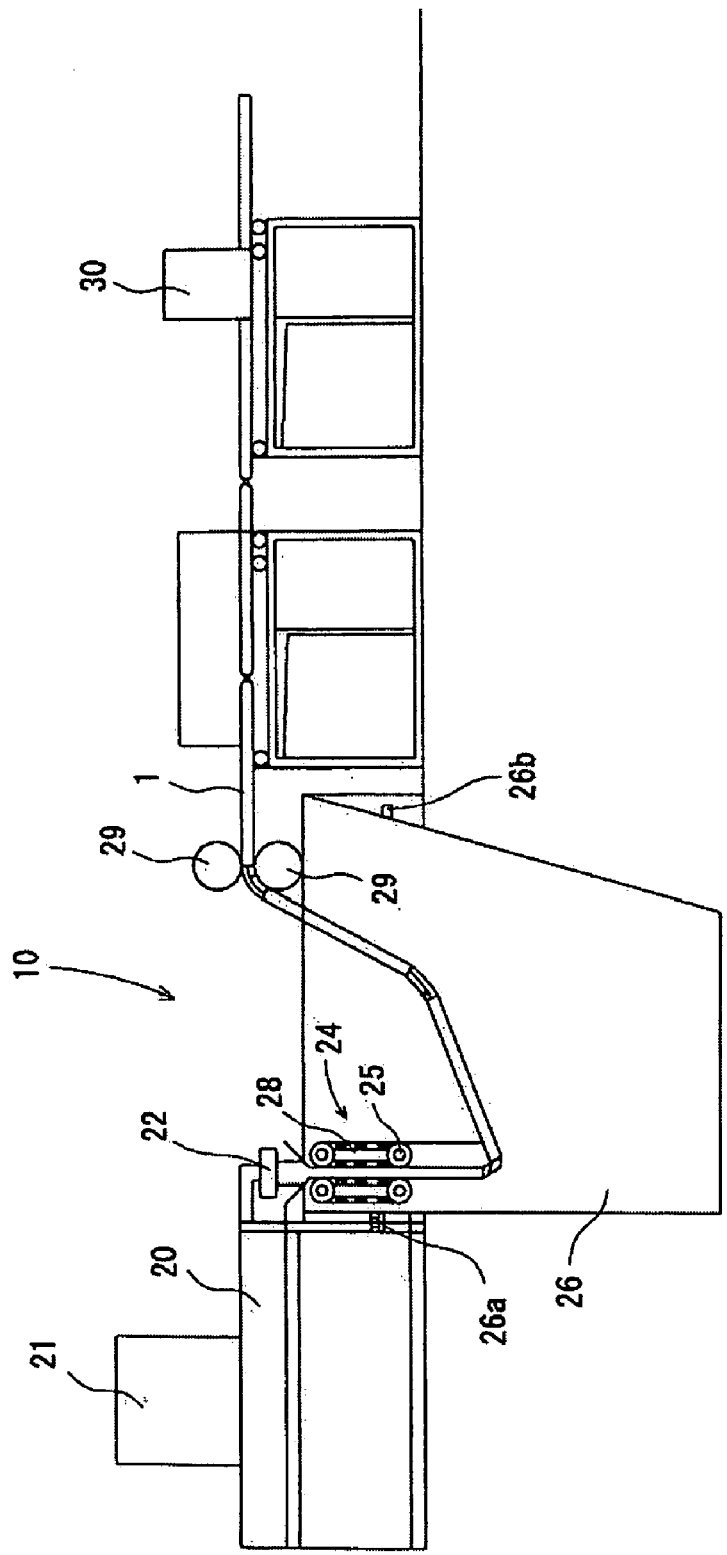
FIG. 4 shows another exemplary method for producing a resin-molded article 1 with a spring structure.

An exemplary system 10 for molding a three-dimensional structure representing an embodiment of the system for molding a resin-molded article 1 with a spring structure mentioned above is described below. As shown in FIGS. 3 and 4, the system, i.e., an extrusion molding system 20 comprises a hopper 21. A thermoplastic resin is fed to the system via the hopper 21, melted after being heating to a predetermined temperature, kneaded and transferred into a molding die 22. The melt is extruded at a predetermined speed through a plurality of nozzles 23, and filaments to constitute a three-dimensional structure 3 are taken off by a winder 24.

Take-off rolls 25, 25 constituting the winder 24 are submerged under water in a bath 26. Each of the take-off rolls 25, 25 comprises a pair of upper and lower rollers connected with an endless belt 28. A water bath 26 has a water inlet valve 26a and a water outlet valve 26b. A resin-molded article 1 with a spring structure is prepared from a three-dimensional structure 3 via the system: filaments 2 constituting a three-dimensional structure are deformed into random loops; adjacent random loops are brought into contact each other to be fused; and the random loops as fused together become solidified after being cooled in water. The take-up rolls 29, 29 lift the thus produced resin-molded article 1 with a spring structure.

As seen from FIG. 4, if it is suspected that filaments constituting a resin-molded article 1 with a spring structure comprising a three-dimensional structure are undesirably resistive to bending when they are taken off by the take-off rolls 25, 25, it is possible to deliberately prepare low-density portions which are more sensitive to bending across the three-dimensional structure at regular intervals. Then, it is possible to bend the resin-molded article 1 at those low-density portions, after they are lifted from water. A cutting unit 30 is used to cut the resin-molded article 1 with a spring structure lifted from the water into pieces having desired lengths.

Figure 5:
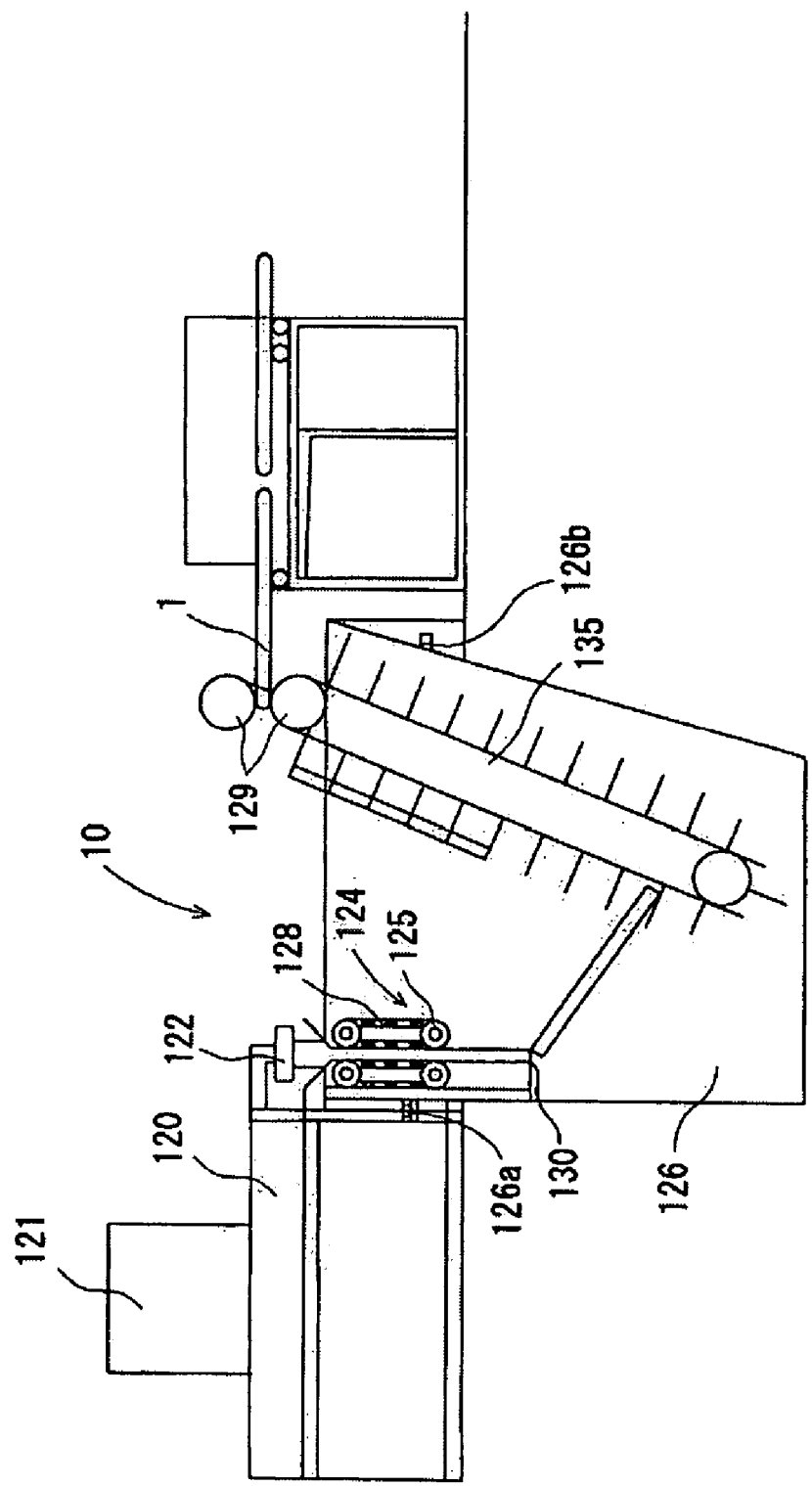
FIG. 5 shows yet another exemplary method for producing a resin-molded article 1 with a spring structure.

FIG. 5 shows another exemplary system. This system further comprises a cutting unit 130 placed in a water bath 126. The cutting unit 130 is put below and close to a winder 124. On a wall of the water bath 126 opposite to the one to which the winder 124 is attached rests a conveying unit 135. The conveying unit 135 comprises a conveyor having multiple stopper spikes protruding from its surface. The stopper spikes are inserted into thin gaps between adjacent three-dimensional structure pieces obtained by cutting a three-dimensional structure sheet by means of the cutting unit 130. The elements corresponding with those of the foregoing embodiment are represented by similar numerals with, however, 1 being attached to the third place of the numerals.

Figure 12:
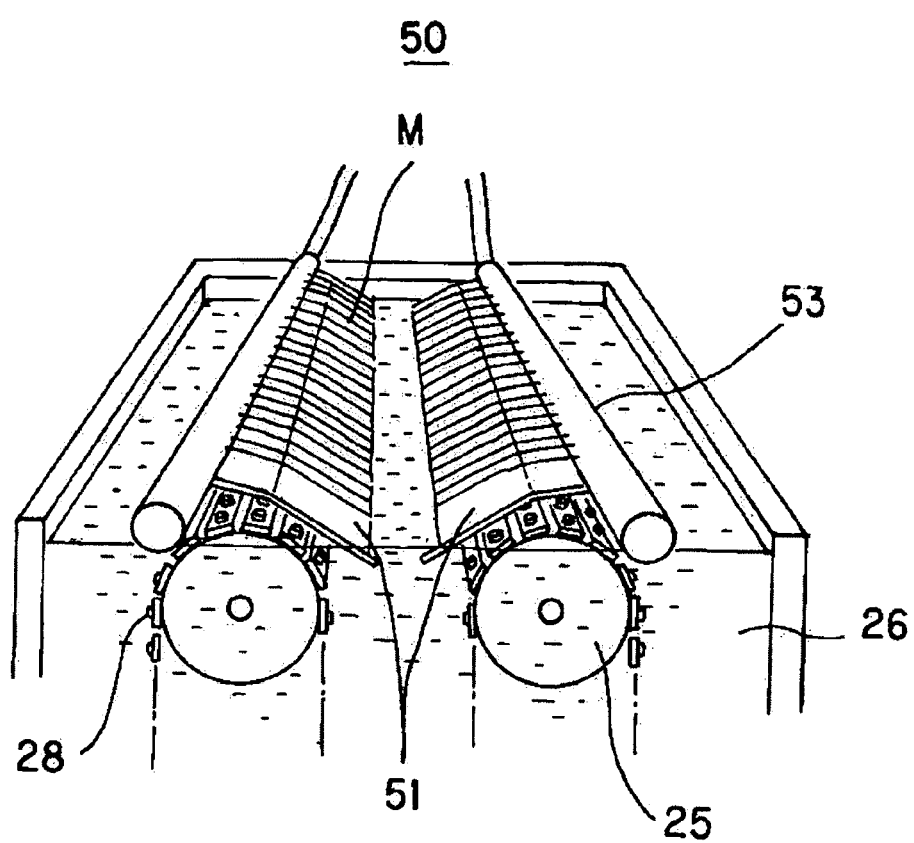
FIG. 12 shows the perspective view of a system previously developed by the present applicants.
Figure 13:
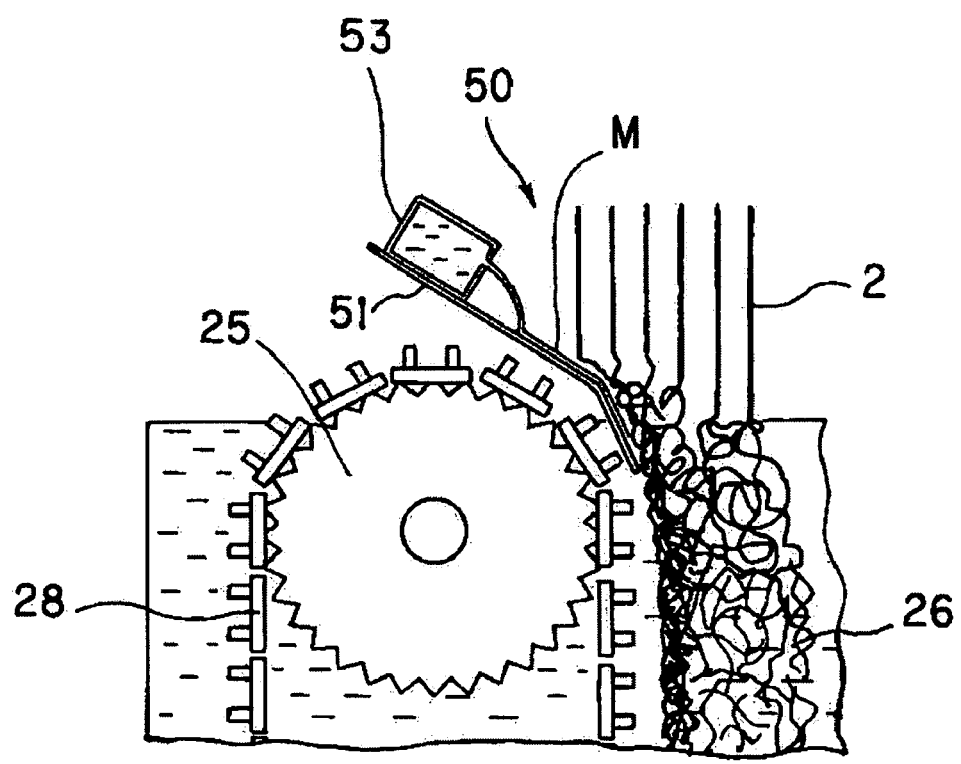
FIG. 13 shows the sectional view of a superficial layer-forming unit of the pilot system.
Figure 14:
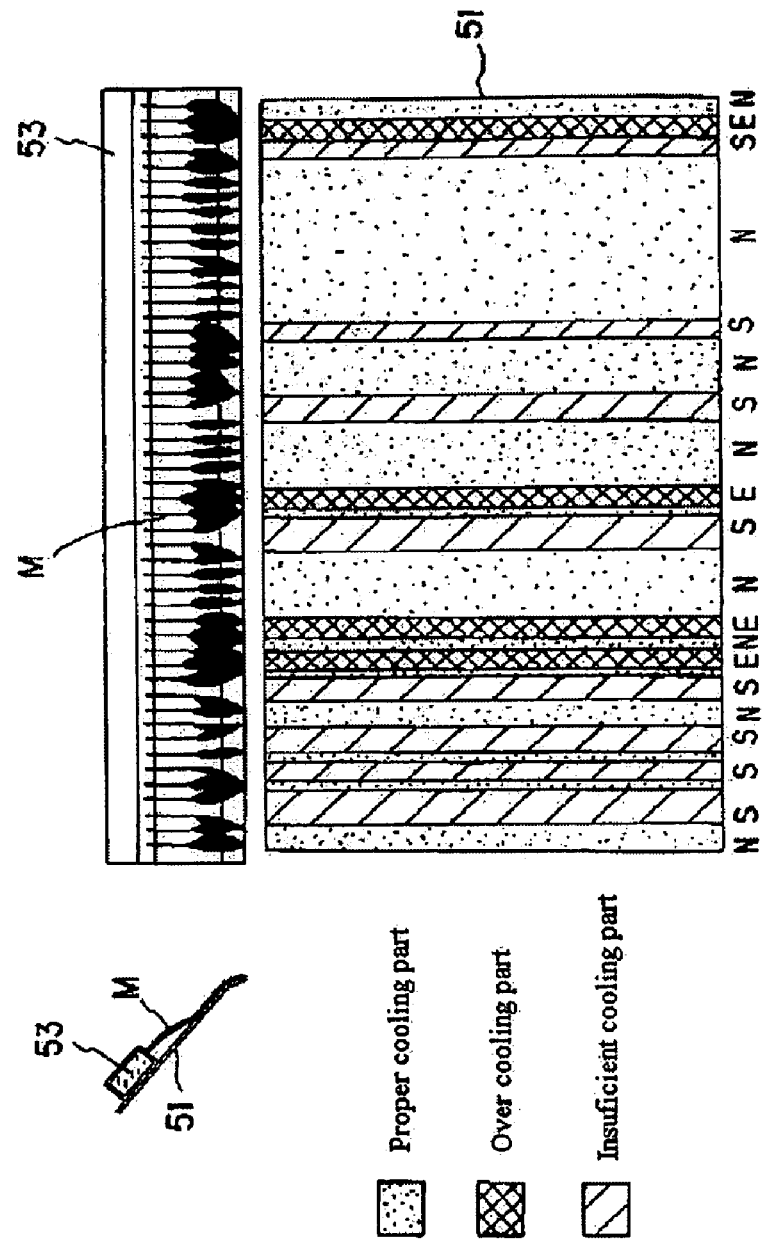
FIG. 14 shows the operation of the superficial layer-forming unit attached to the pilot system.
Figure 15A:
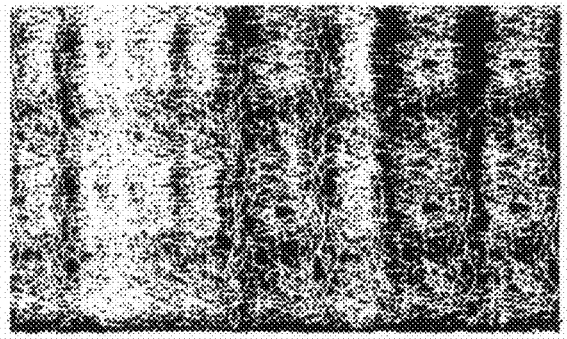
FIG. 15(A) shows undulations formed on the surface of a product produced by the superficial layer-forming unit of the pilot system.
Figure 15B:
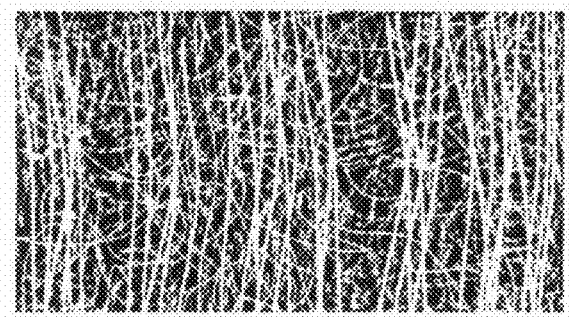
FIG. 15(B) shows pattern ① of disintegrated cut ends of filaments.
Figure 15C:
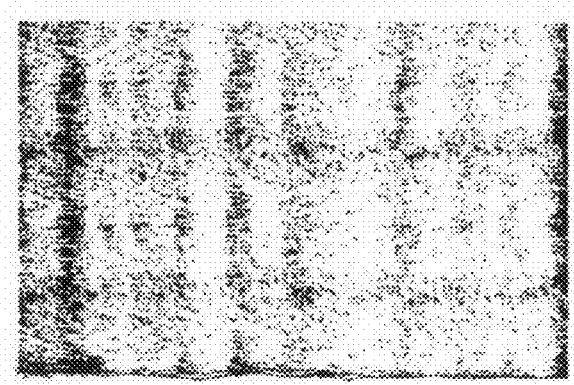
FIG. 15(C) shows pattern ② of disintegrated cut ends of filaments, and FIG. 16(A) compares the joining distance (δ) of the molding system of the invention with the joining distance (γ) of the pilot system.
Figure 16A:
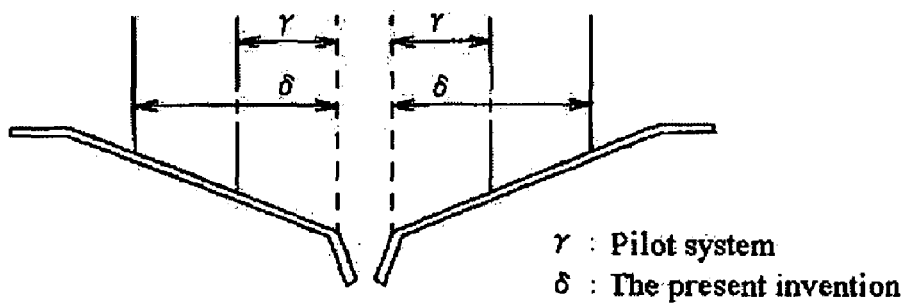
FIG. 16(B) shows how a superficial layer of a three-dimensional structure is formed by the pilot system.
FIG. 16(C) shows how the joints of fused filaments constituting a three-dimensional structure are separated during processing by the pilot system.
Figure 16B:
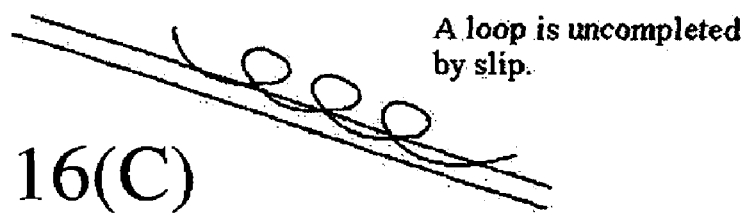
Figure 16C:
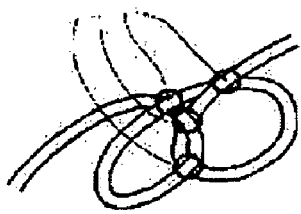

Now, description is given on a superficial layer-forming unit 50. The superficial layer-forming unit 50 is for increasing the density of superficial layers of the resin molded article with a spring structure 1 by operating on melted continuous filaments 2 extruded from a die 22, that is, by restricting/compressing the thickness of the filaments before the filaments contact with water in a water bath 26, to produce thereby a resin-molded article 1 with a spring structure having dense superficial layers. Furthermore, according to the superficial layer-forming unit 50, it is possible to ensure the smooth formation of loops, and the uniform fusion of adjacent loops. Still further, according to the superficial layer-forming unit 50, it is possible to solidify filaments before they contact with the surface of an endless conveyor belt 28, thereby preventing the surface undulation of the belt from being printed on the filaments. Of course, this effect is more apparent if the endless belt 28 is wound around a caterpillar (see FIG. 12).

Figure 7A:
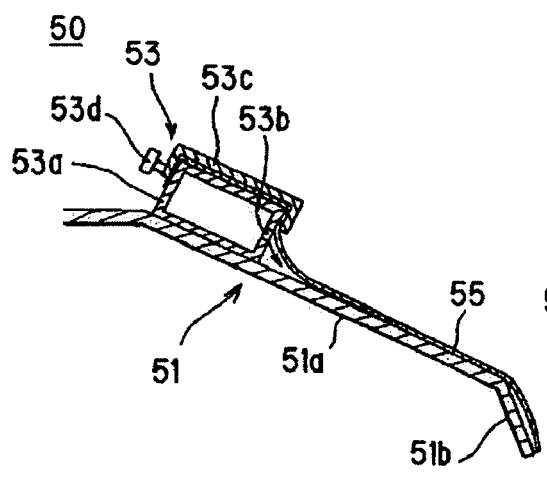
FIG. 7(A) shows the sectional view of a superficial layer-forming unit, and FIG. 7(B) the frontal view of the same unit with a water-permeating unit being removed.
Figure 7B:
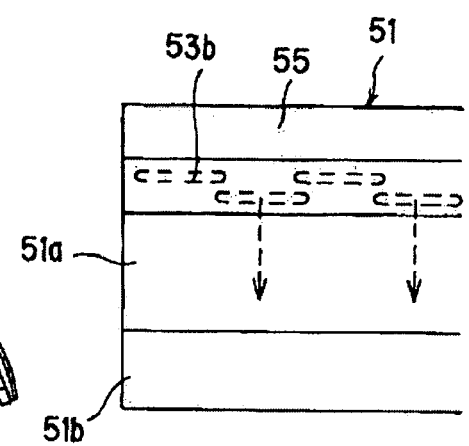
Figure 8A:
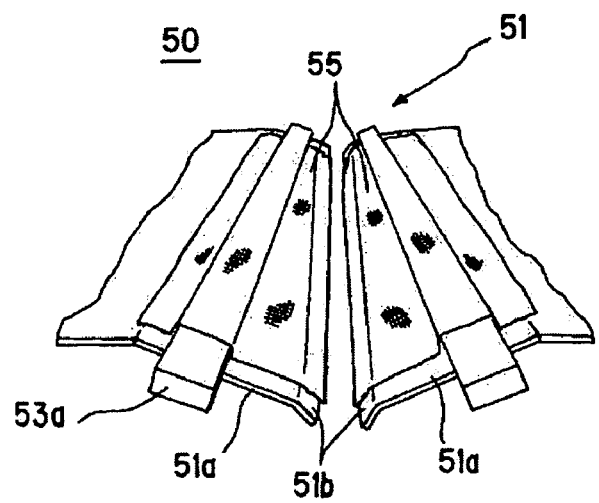
FIG. 8(A) shows the perspective view of the superficial layer-forming unit, and FIG. 8(B) the enlarged view of the same unit.
Figure 8B:
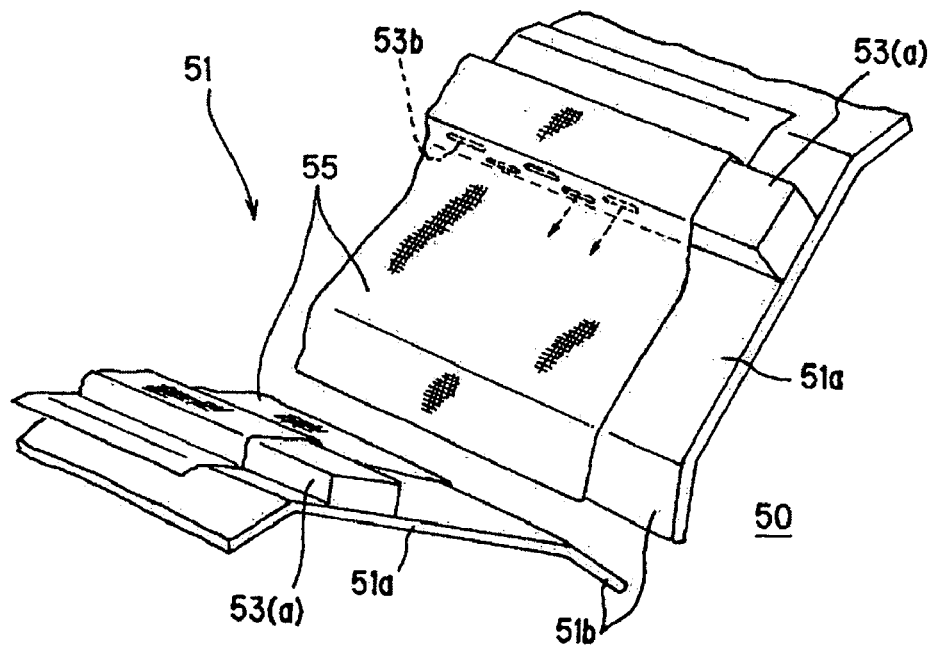
Figure 9:
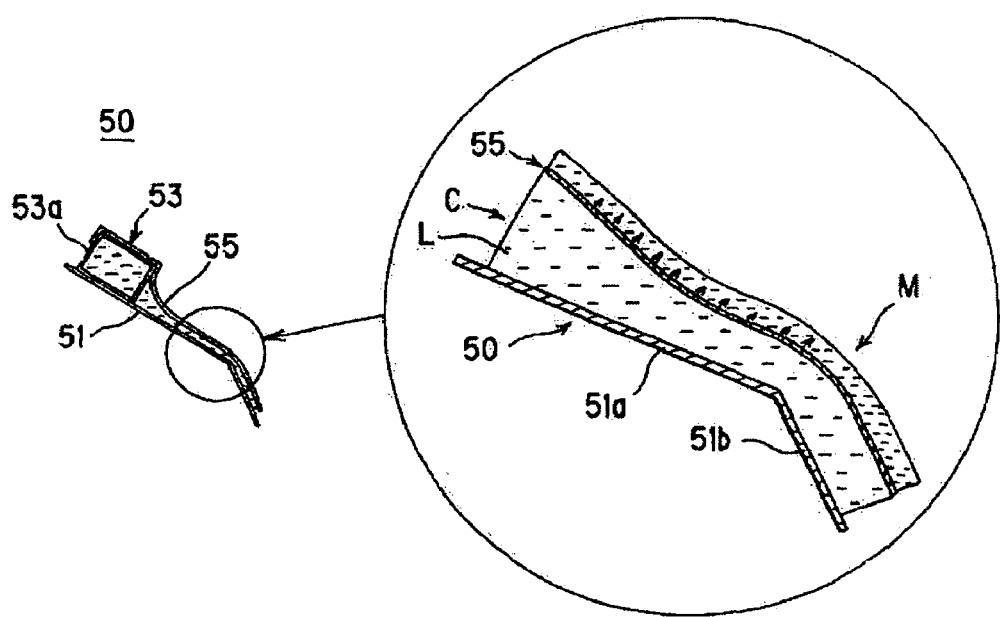
FIG. 9 illustrates the operation of the superficial layer-forming unit.
Figure 11:
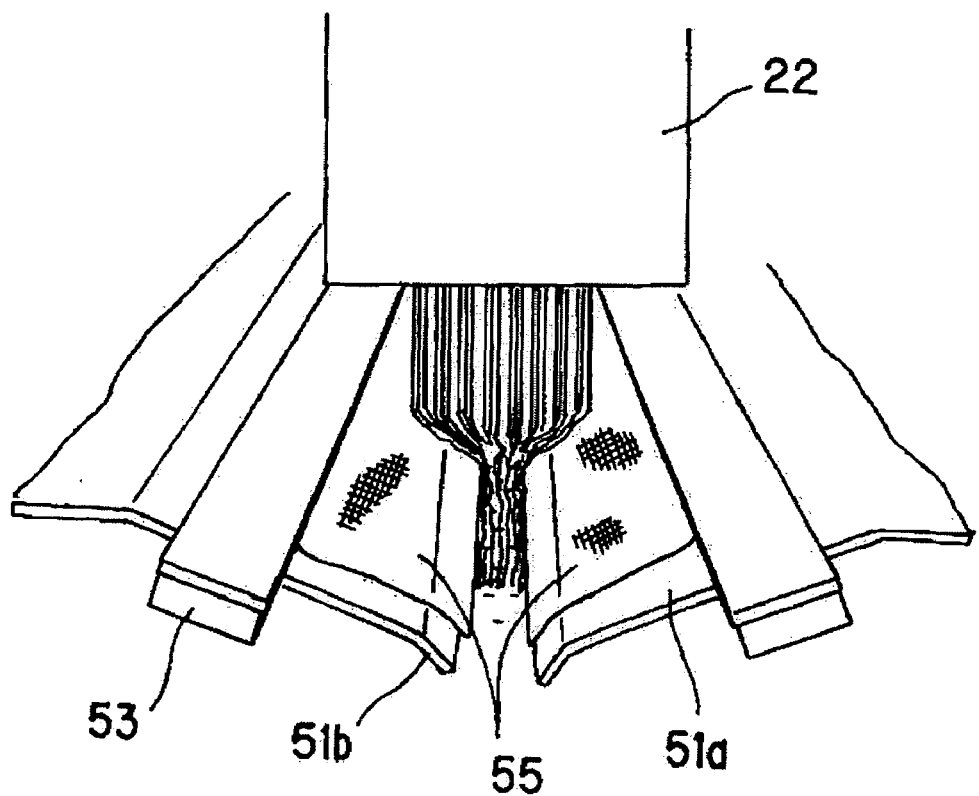
FIG. 11 schematically shows how a three dimensional structure is processed by the method of the invention.

As shown in FIGS. 7-9, the superficial layer-forming unit 50 comprises a pair of shoots 51 which are horizontally arranged along the two lengthwise sides of a three-dimensional structure 3 comprising multiple melt filaments 2 which are extruded via a die 22 located upward to fall downward, the shoots 51 having symmetrical downward slopes in profile to restrict/compress the thickness of the three-dimensional structure 3 passing through the gap between them so that the thickness of the three-dimensional structure 3 is reduced at a specified ratio after having passed through the gap, a pair of water supply portions 53 located upward which supply water for cooling the three-dimensional structure 3, and a pair of water-permeating sheets 55 which cover the surfaces of the shoots 51 and are attached to the water supply portions 53.

Each shoot 51 comprises a bluntly inclined plate 51*a* having a bluntly inclined slope and a sharply inclined plate 51*b* having a sharply inclined slope which extends from the lower end of the bluntly inclined plate 51*a*. The lower ends of the sharply inclined plates 51*b* preferably correspond in profile with the inner edges of an endless belt 28.

Generally, the shoot 51 is made from a metal, preferably stainless steel. This is because stainless steel is resistant to rusting even when it is exposed to water. To be given excellent water repellent and spreading activity, the top surface of the shoot 51 is preferably coated with a fluorine resin.

In this particular system, a die outlet with nozzles 23 has a rectangular cross-section with a length of 1300 mm and width of 80 mm. Each shoot 51 has a length of 1300 mm and thickness of 3 mm. The gap between oppositely disposed sharply inclined plates 51*b* is set to be 40 mm.

Beneath the shoots 51 is placed a winder 24 as described above. The thickness of a resin-molded article 1 with a spring structure is reduced by 30 to 70% (compression ratio), preferably 40 to 60% with respect to the thickness of a three-dimensional structure 3. In the particular example shown in FIG. 6, a three-dimensional structure 3 has a width of 80 mm, while a resin-molded article 1 with a spring structure prepared from the structure 3 has a thickness of 40 mm. The compression ratio is set to 50% in this case as is usually observed in the production of resin-molded articles 1 with a spring structure.

Water-permeating sheets 55 similar to those of the foregoing embodiment are arranged in this system. They are preferably made of cloth (bleached cloth), but may be made of a cloth substitute. The water-permeating sheet 55 preferably allows water to pass through it to appear on its surface. Then, cooling water C not only flows beneath the water-permeating sheet 55 but also penetrates the sheet to appear on its top surface. The water-permeating sheets 55 are for ensuring the uniform spread of cooling water C over the entire top surfaces of the shoots 51. The water-permeating sheets 55, when contacting with falling melted filaments, encourage the loop formation of the filaments with the aid of the frictional forces generated as a result of contact. The water-permeating sheet 55 preferably has a thickness of 0.3 to 0.4 mm.

As shown in FIGS. 6 and 7, each water supply portion 53 comprises a tank 53*a* for storing water which has a cubic shape with a rectangular cross-section, and is fixed lengthwise horizontally on the upper end of bluntly inclined plate 51*a*, cooling water outlets 53*b* formed on the lowermost surface of tank 53*a* for ejecting cooling water, a metal bar 53*c* with a C-shaped cross-section for attaching the water-permeating sheet 55 to the tank 53*a*, and screws 53*d* for fastening the metal bar 53*c* to the tank 53*a*. The cooling water outlets 53*b* are formed on the lowermost surface of the tank 53*a*. The shape of the cooling water outlet 53*b* is not limited to any specific one, but is preferably slit-like when viewed from front. Alternatively, it may take a round, or square shape instead of a slit-like shape. The cooling water outlet may exist as discrete dots or as a linear slit. The tank 53*a* is connected via a hose and tap to a water source (not illustrated), for example, public water supply.

As shown in FIG. 9, when cooling water C is transferred to the tank 53*a*, cooling water C is ejected from the outlets 53*b* and allowed to flow between the water-permeating sheet 55 and the bluntly inclined plate 51*a*, to form an underlying current L. Some part of cooling water C passes through the water-permeating sheet 55, and appears on its top surface to form an overlying current M there. The overlying currents M on both sides contact with the lengthwise sides of a three-dimensional structure 3 to form eddies there, thereby facilitating filaments to form loops and adjacent continuous filaments to contact each other.

The course of a given filament, after being extruded from a nozzle of the die 22, is not uniform but random. But, generally speaking, filaments which will constitute the core layer 6 of a three-dimensional structure 3 tend to take a spiral course in the propulsion direction, while filaments which will form the superficial layers 4, 5 tend to take a loop course in parallel with the surfaces of the three-dimensional structure.

Although the water-permeating sheet 55 is soft, it hardly moves even though it is exposed to the currents of cooling water, and remains stabilized. The water-permeating sheet 55 is permeable to water, and thus water from the underlying current L penetrates the water-permeating sheet 55 to appear on its top surface to form an additional current there. The water-permeating sheet 55 spreads the overlying current so much that the overlying current M having a uniform thickness is allowed to flow over the entire surface of the water-permeating sheet 55. Namely, the water-permeating sheet 55 absorbs some part of underlying water current and spreads it laterally on its top surface. Thus, the water-permeating sheet 55 prevents the formation of thin thread currents, and their merging, and allows the overlying water current M to have a uniform thickness. Accordingly, the water-permeating sheets 55 allow the superficial layers 4, 5 of a three-dimensional structure to be cooled uniformly. Moreover, since the water-permeating sheet 55 has a higher frictional coefficient than does a metal, it exhibits a higher resistance to the falling movement of melted continuous filaments constituting a three-dimensional structure which causes the filaments to be deformed into loops and curls by forcibly retarding their downward fall. The water-permeating sheet 55 promotes the formation of more firm loops than are observed with a similar fluorine resin-coated sheet because it exerts stronger frictions upon the filaments than does the latter.

A three-dimensional structure 3 including compactly folded loops in its superficial layers 4, 5 with the long axis of the loops in parallel with the lengthwise surfaces is placed with respect to the overlying water currents M such that the folded loops are placed in parallel with the flow ends of the overlying water currents M to be cooled by the latter. Moreover, both the superficial layers 4, 5 are compressed.

On the other hand, filaments which will constitute the core layer 6 form spiral loops. Then, the three-dimensional structure 3 is captured by a winder 24.

The advantages of the present embodiment will be enumerated below.

A) Some part of water penetrates the water-permeating sheet 55 to form an overlying current M thereupon. This prevents the adhesion of filaments to the shoot 51.

B) The water-permeating sheet 55 has a higher frictional coefficient than does a fluorine resin-coated surface or a metal, and thus it exhibits a higher resistance to the falling movement of melted continuous filaments, thereby facilitating the filaments to be deformed in firm loops.

C) Melted continuous filaments fall on the water-permeating sheet 55 covered with the overlying water current M both of which have a cushioning activity. Thus, the filaments are encouraged to form firm loops, and the cross-section of the filaments 2 is protected against deformation. Although the filaments fall at a considerably high speed, they are allowed to form firm loops on account of the cushion activities of the water-permeating sheet 55 and overlying water current M without being distorted in their cross-section. The latter feature is particularly advantageous if the filaments are hollow.

The advantages ensured by the method of the present invention are as follows.

Loop separations are few. The moment fused filaments separate, the overall strength of a three-dimensional structure greatly lowers. To maintain the strength of a three-dimensional structure, it is most important to prevent the separation of fused filaments.

According to the pilot system, filaments slip so well that their loop formation is disturbed. According to the present system, there are formed two water currents one flowing over the water-permeating sheet 55 and the other beneath the same. Therefore, even if filaments fall upon the overlying currents to form loop there, the loop formation occurs smoothly because the overlying water current has a good cushion property, and the water-permeating sheet 55 exhibits such a strong friction to the downward fall of the filaments as to retard the movement of the filaments.

It is possible to greatly restrict/compress the thickness of a bundle of melted continuous filaments extruded from the die. Because a bundle of filaments can be compressed in thickness so greatly that the entanglement of individual fibers is emphasized, and contact areas between adjacent loops are increased to facilitate their fusion.

It is possible to mold filaments into a resin-molded article with a spring structure whose surfaces are smooth.

Accordingly with the present system it is possible to provide products having following features.

Resin-molded articles produced with the system have smooth dense surfaces practically free from nap and undulations. Thus, even if they are wrapped with a cover, they do not damage the cover.

Fusion of filaments in the superficial layers 4, 5 is so strong that it is refractory to separation.

Filaments in the superficial layers 4, 5 are so dense and their fusion is so strong that the resin-molded article is excellent in pressure dispersion. If the article is used as a material of cushion, and receives the weight of a sitting person, the superficial layers of the cushion disperse the weight of the person, and prevents the core layer 6 from being exposed to overweight. Therefore, even if the core layer has a coarse texture, it can withstand a considerable weight, and the cushion keeps a sufficient buffering activity. In addition, the superficial layers 4, 5 are so dense that fused filaments in the layers are hardly pulled apart even if they are exposed to hard external forces.

Fusion of adjacent loops is so strong that the layer comprising such loops has a high bending resistance.

The three-dimensional structure 3 can be narrowed/compressed greatly in its thickness. Therefore, it is possible to produce a thin resin-molded article with a spring structure. The loop formation in the superficial layers 4, 5 is improved so much that, even if the resin-molded article has a small thickness, it can have a good cushion activity and resistance to collapse. Since the product has a small thickness, its handling becomes easy, which leads to a reduced production cost.

Filaments in the superficial layers 4, 5 form loops (peripheral loops) whose long axes are vertical to the adjacent surfaces. On the other hand, filaments in the core layer 6 form loops (central loops) whose long axes are in parallel with the long axis of the three-dimensional structure. The core layer is responsible for the cushion activity of the three-dimensional structure.

Method for Producing a Resin-Molded Article with a Spring Structure 1

An exemplary method for producing a resin-molded article 1 with a spring structure as described above is described below.

As shown in the diagrams of FIG. 10, according to the method of this embodiment for producing a resin-molded article 1 with a spring structure, preferably, a polyolefin resin such as PE, PP or the like and another resin such as VAC, EVA or SBS are fed, in appropriate amounts, via a supplier such as a tumbler or weighing feeder, and the yield is dry-blended, mixed, or dissolved in a solvent, kneaded and fragmented into pellets. The pellets are transferred to a hopper 21 of a compression molding system 20.

To be more specific, starting resins, e.g., PP and SBS are mixed with a tumbler (KR mixer, Kato Scientific Instruments Co.) at 40 rpm for 15 minutes.

Next, as seen from FIG. 3, a mixture comprising the starting resins is applied via a hopper 21 to a uni-axial (axis diameter being 65 mm) compression molding system 20 (see FIG. 4). The mixture is melted at a predetermined temperature (200° C. for Examples 1 to 6, and 260° C. for Examples 7 to 9), and the melt is kneaded and subjected to melt-extrusion at a predetermined speed through a plurality of nozzles on the extrusion surface of a molding die 22, taken off by a winder 24 which is described later, and formed into solid and/or hollow continuous filaments having a predetermined diameter (e.g., 600 to 90,000 deniers, preferably 3,000 to 30,000 deniers, more preferably 6,000 to 10,000 deniers). The filaments 2 in a melted state are passed through a superficial layer-forming unit 50 as described above with reference to FIGS. 6-9 and FIG. 11, which causes adjacent filaments 2 to contact each other to be entwined into random loops having a diameter of 1 to 10 mm, preferably 1 to 5 mm. The contacted and entwined portions of filaments are at least partially fused and bonded to one another. The filaments 2 may comprise solid filaments and hollow filaments at a predetermined ratio.

The thickness and bulk density of a three-dimensional structure or a mass of random loops may be determined as appropriate by adjusting the gap between the take-off rolls 25, 25 of winder 24 in a bath 26. The three-dimensional structure (e.g., 10 to 200 mm in width and 2,000 mm in length) obtained by processing filaments 2 into a mass of random curls or loops, and hardening them in water, is passed through a pair of take-up rolls 29, 29 to produce a resin-molded article 1 with a spring structure.

When filaments 2 which have been formed into loops in water are taken off by the winder 24, the cushion property of the resulting three-dimensional structure may be altered as appropriate by adjusting the take-off speed of the winder 24. The three-dimensional structure, when it is required to have a comparatively high bulk density, should have a bulk density of 0.03 to 0.08 g/cm$^3$, preferably 0.04 to 0.07 g/cm$^3$, most preferably, 0.05 to 0.06 g/cm$^3$.

In taking off the filaments, the take-off speed of the winder 24 is adjusted to a low take-off speed at intervals of e.g., 3 to 5 m by e.g., reducing the take-off speed of take-off rolls 25, 25 to a low predetermined level at certain predetermined regular intervals in synchrony with a timer. Then, it is possible to obtain a resin-molded article 1 with a spring structure comprising a series of alternate high-density portions and low-density portions repeating at regular intervals (e.g., 30 to 50 cm) in a longitudinal direction, the high-density portions being formed when filaments are taken off at a low take-off speed while the low-density portions being formed when filaments are taken off at a high take-off speed.

As seen from FIG. 4, if it is expected that filaments constituting a resin-molded article 1 with a spring structure comprising a three-dimensional structure will hardly be bent as needed when they are taken off by the take-off rolls 25, 25 at a normal constant speed, it is possible to adjust the take-off speed of the winder as above to produce a three-dimensional structure comprising a series of high-density portions and low-density portions, such that the three-dimensional structure can be bent at their low-density portions. The resin-molded article 1 with a spring structure obtained via the above-described process is cut with a cutting unit 30 into pieces having a desired length.

The above-described process produces, for example, a resin-molded article with a spring structure 1 having a bulk density of 0.03 g/cm$^3$ and thickness of 50 mm. The three-dimensional structure may be prepared from filaments made of one, or two or more kinds of resins.

Exemplary Molding Systems

The extrusion system used was a uni-axial extrusion system with a diameter of 90 mm. The starting material was an ethylene vinyl acetate copolymer. The processing conditions were as follows. The temperature of the resin was 250° C.; the molding pressure 0.1 Mpa; the rotation of the screw 30 rpm; the extrusion force 135 kg/hr; and the take-off speed 32.3 m/hr.

Exemplary Resins

Example for the Production of which Two Kinds of Resins were Blended at a Different Ratio (1)

Two kinds of resins including PE+VAC, PE+EVA and PP+SBS are combined at different ratios to produce different kinds of three-dimensional structures which is a precursor of resin-molded articles 1 with a spring structure.

Blending of the resins was achieved by using a tumbler (KR mixer, Model KRT-100, Kato Scientific Instruments Co.) at 40 rpm for 15 minutes. Molding of the resin blend was achieved by using a uni-axial (axis diameter being 65 mm) compression molding system: the screw was rotated at 60 rpm; and take-off speed set at 3.1 or 0.6 m/min. The melting temperature of the resin blend was set to 200° C.

Example for the Production of which Two Kinds of Resins were Blended at a Different Ratio Exemplary blends were prepared by combining PE 70 wt % or more +VAC 30-90 wt %, PE 34-89 wt %+EVA 66-11 wt %, and PP 70-95 wt %+SBS 30-5 wt %. Those blends were extruded at 28 kg/h to produce resin-molded articles with a spring structure having a thickness of 50 mm and length of 300 mm. The physical dimensions of each product were as follows: the bulk density was 0.03 g/cm$^3$; diameter of filaments 1.5 mm; surface area 300×300 mm$^2$; and thickness 50 mm.

Example for the Products having Different Bulk Densities

A blend obtained by combining PE and VAC at PE:VAC=90:10 was used to provide resin-molded articles with a spring structure which have different bulk densities. Blending of the resins was achieved by using a tumbler (KR mixer, Model KRT-100, Kato Scientific Instruments Co.) at 40 rpm for 15 minutes. Molding of the resin blend was achieved by using a uni-axial (axis diameter being 65 mm) compression molding system: the screw was rotated at 60 rpm; and take-off speed set at 3.1 or 0.6 m/min. The melting temperature of the resin blend was set to 200° C.

A similar blend was obtained by combining 90 wt % of PE and 10 wt % of VAC. The blend melt was extruded at 28 kg/h, and taken up at 3.1-0.6 m/min.

The physical dimensions of each product were as follows: the bulk density was 0.01 and 0.05 g/cm$^3$; diameter of filaments (hollow) 1.5 mm; surface area 300×300 mm$^2$; and thickness 50 mm.

All the exemplary products exhibited no notable yielding points. If the product that does not exhibit a notable yielding point is used as a pad of a cushion, the cushion will not show a deep dimple even when it receives a heavy load, but disperse the load so uniformly over its top surface that every part of the top surface will equally support the load.

If the product was bent by 50% or more, the resulting strain did not show a sharp rise. If that three-dimensional structure was deformed in the width direction by up to 90%, the deformation was reversible. If the product is used as a pad of a cushion, and a man sits on the cushion, he will never feel like falling down to a hard bottom. The cushion, as soon as the load is relieved, will recovers its original form, and be resistant to collapse.

Next, the three-dimensional structure which serves as a precursor of all the exemplary resin-molded articles 1 with a spring structure was compared with a conventional three-dimensional structure prepared from PP alone by a conventional method. One comparable sample had a notable yielding point, exhibited a sharp rise in strain when bent by a heavy load, underwent plastic deformation, and did not recover its original form when extremely bent. Another comparable sample did not have a yielding point, exhibited a sharp rise in strain when bent by 50% or more, and, when it was used as a pad of cushion, caused a person sitting on the cushion to feel like falling down to a hard bottom. Further, this sample underwent plastic deformation and did not recover its original form when extremely bent.

It is possible according to this exemplary method of the invention to provide a resin-molded article 1 with a spring structure having a desired hardness by adjusting the blending ratio of combined resins, and the bulk density of a three-dimensional structure of the resin-molded article 1.

The exemplary three-dimensional structure showed as high resistance to collapse as did a similar, urethane foam-based structure.

The impact resilience of the exemplary three-dimensional structure was as high as 91%. The exemplary product of the invention showed an impact resilience 1.4 time higher than did a comparable product made of urethane foam.

The resin-molded article with a spring structure embodying the present invention is not limited to those described above, but may include various variants as long as the variants are included within the technical scope of the invention. It is also possible to modify the present invention without departing from the spirit of the invention. It should be understood that such variants, modifications and equivalents are also included within the technical scope of the invention.

Thus, the broadest claims that follow are not directed to a machine that is configure in a specific way. Instead, said broadest claims are intended to protect the heart or essence of this breakthrough invention. This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation so as to protect the heart of this invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense. It is also to be understood that the following claims are intended to cover all of the generic and specific features of the invention herein described, and all statements of the scope of the invention which, as a matter of language, might be said to fall therebetween.

Now that the invention has been described;

REFERENCE NUMERALS

- 1: Resin-molded article with a spring structure
- 2: Filament
- 3: Three-dimensional structure
- 4, 5: Superficial layers
- 6: Core layer
- 10: System for molding a three-dimensional structure
- 20: Extrusion molding unit
- 21: Hopper
- 22: Molding die
- 23: Nozzle
- 24: Winder
- 25, 25: Take-off rolls
- 26, 126: Bath
- 27: Roller
- 28: Endless belt
- 29, 29: Take-up rolls
- 30, 130: Cutting unit
- 50: Superficial layer-forming unit
- 51: Shoot
- 53: Water supply portion
- 55: Water-permeating sheet
- 51$a$: Bluntly inclined plate
- 51$b$: Sharply inclined plate
- C: Cooling water
- 53$a$: Tank
- 53$b$: Cooling water outlet
- 53$c$: Holding metal bar
- 53$d$: Screw
- L: Overlying water current
- M: Underlying water current

What is claimed is:

1. A system for producing a resin-molded article with a spring structure, the article comprising a three-dimensional structure including voids at a predetermined bulk density, the three-dimensional structure having a core layer sandwiched between oppositely disposed superficial layers being obtained by extruding a melt of a thermoplastic resin and/or a thermoplastic elastomer into melted continuous solid and/or hollow filaments, and causing adjacent filaments to contact each other, entwine and gather to form random loops and curls, the system comprising:

an extrusion molding system comprising a hopper;
   a molding die comprising a plurality of nozzles;
   a bath having a water inlet valve and a water outlet valve;
   rectangular shoots each having an inclined surface placed opposite to each other with a gap in between to receive the filaments in such a manner as to shift the gap narrower in lengthwise of the filaments passing through the gap;
   water-permeating sheets covering top surfaces of the respective shoots;
   cooling water supply portions each of which provides water flow between the water-permeating sheets and the top surface of the respective shoots,
   wherein some part of the water flow penetrates the water-permeating sheets to appear on their top surfaces to form thereon an overlying water current uniformly spreading lengthwise, while the other part of the water flow forms an underlying water current, and peripheral filaments constituting lengthwise surfaces of the three-dimensional structure which will constitute the superficial layers of the three-dimensional structure are exposed to and agitated by the overlying water current such that adjacent filaments are caused to contact each other, entwine and gather to form loops and curls;
   a winder to take off the filaments after passing through the gap, the winder being submerged under water in the bath, the winder including take-off rolls comprising a pair of upper and lower rollers connected with an endless belt;
   take-up rolls to lift the resin-molded article from the bath; and
   a cutting unit to cut the resin-molded article into pieces having desired lengths.

2. A system for producing a resin-molded article with a spring structure as in claim 1, wherein the water-permeating sheets are made of a material which allows water to permeate, and has a higher frictional coefficient than stainless steel or fluorine resin.

3. A system for producing a resin-molded article with a spring structure as in claim 1, wherein each shoot consists of a stainless steel plate whose working surface is coated with a fluorine resin.

* * * * *